No. 798,746. PATENTED SEPT. 5, 1905.
E. J. DE NORMANVILLE.
DRIVING GEAR FOR MOTOR CARS, &c.
APPLICATION FILED APR. 1, 1905.
2 SHEETS—SHEET 2.
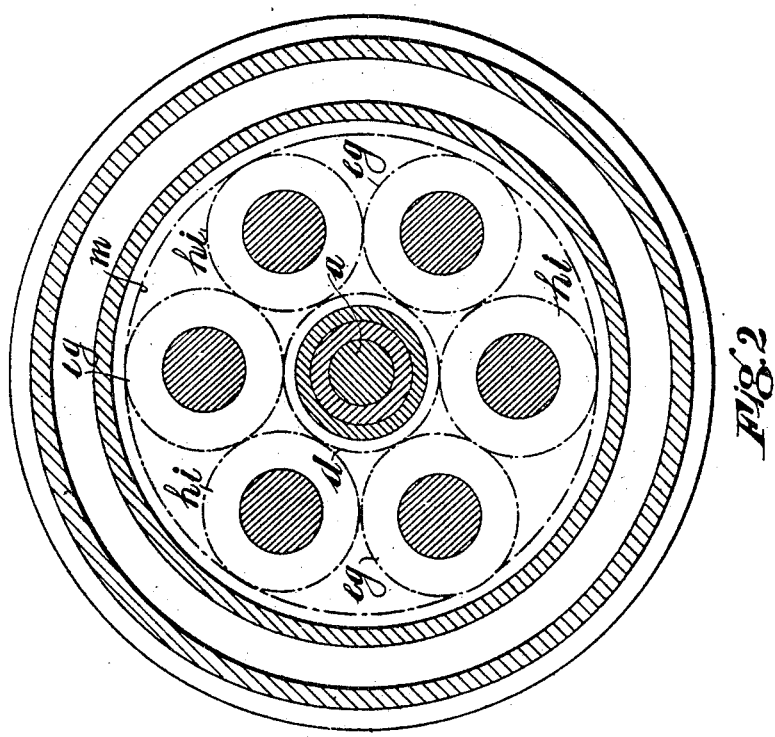
Witnesses
Inventor
Edgar J. de Normanville

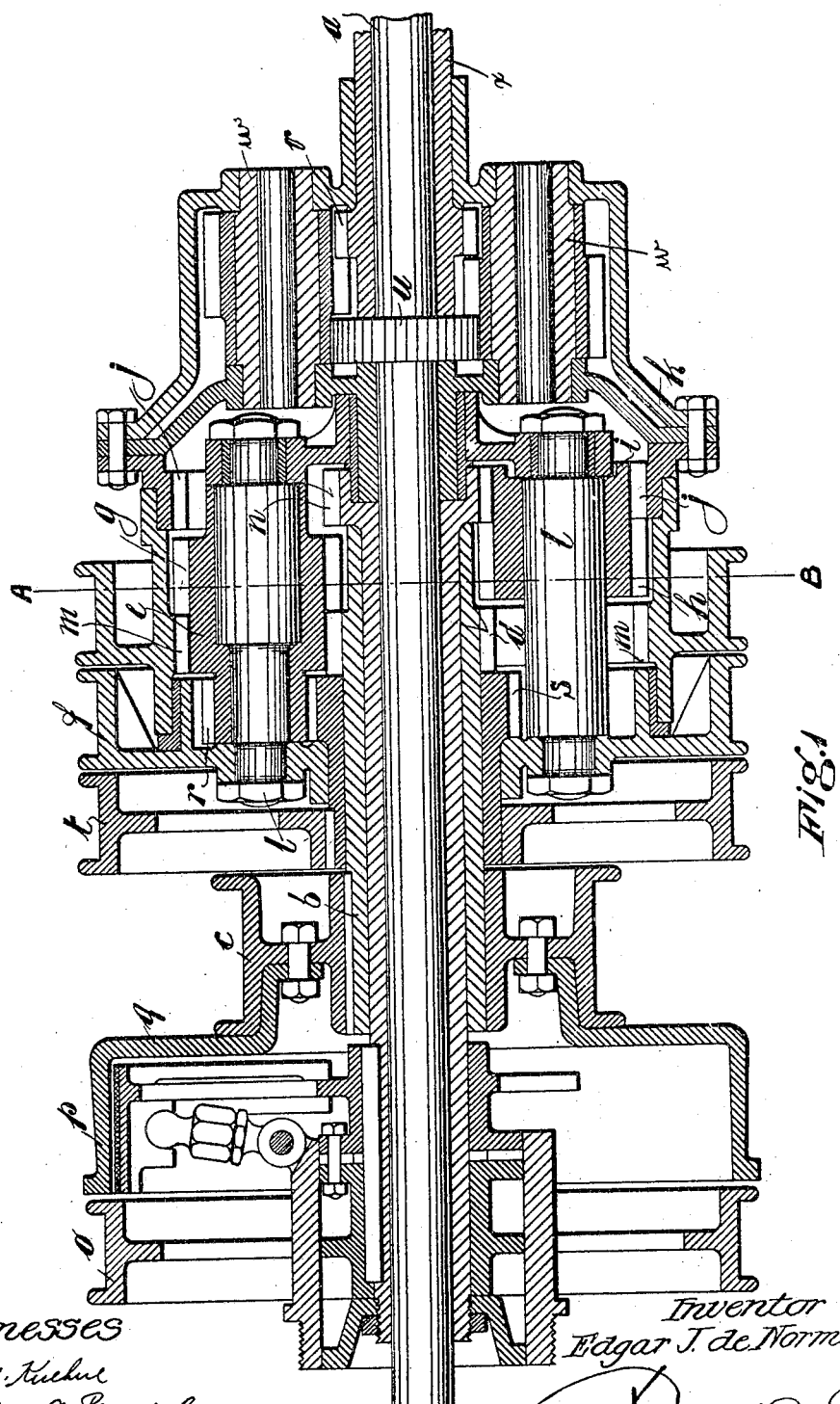

UNITED STATES PATENT OFFICE.

EDGAR JOSEPH DE NORMANVILLE, OF LEAMINGTON SPA, ENGLAND.

DRIVING-GEAR FOR MOTOR-CARS, &c.

No. 798,746. Specification of Letters Patent. Patented Sept. 5, 1905.

Application filed April 1, 1905. Serial No. 253,290.

*To all whom it may concern:*

Be it known that I, EDGAR JOSEPH DE NORMANVILLE, a subject of the King of Great Britain, residing at 6 Clarendon Crescent, Leamington Spa, in the county of Warwick, England, have invented new and useful Improvements Relating to Driving-Gear for Motor-Cars and for other Services, of which the following is a specification.

This invention relates to driving-gear for motor-cars and for other services, my object being to construct and arrange change or variable speed gear of the epicyclic type in compact form and suitable for convenient combination with the differential or balance gear and to adapt it to give a greater number of variations than is ordinarily obtainable with such speed-gear.

Referring to the two accompanying sheets of explanatory drawings—

Figure 1 is a longitudinal section, and Fig. 2 is a transverse section on line A B of Fig. 1.

The complete epicyclic trains forming the speed-gear and also the differential or balance gear are mounted, as illustrated in the drawings, about a one-part or undivided shaft or axle, such as $a$.

Upon one end of a sleeve, as $b$, formed with or fixed to a chain or other wheel or driving element $c$, is a central gear-wheel or pinion $d$, forming the sun-wheel of an epicyclic system. A set (preferably three) of planetary wheels or pinions $e$, arranged in constant gear with the said sun-wheel $d$, are mounted on a rotatable carrier comprising a brake-drum or equivalent part, as $f$, which may be set free to rotate or held against rotation, as desired. With each of the said planetary wheels or pinions $e$ there is formed or attached an extension or another pinion $g$, which engages what may be termed a "secondary" or "intermediate" planet or planetary pinion $h$, and an extension $i$ from this latter pinion engages and drives an internally-toothed ring or annulus $j$, attached to or forming part of the driven element $k$, inclosing the differential or balance gear, to which further reference will be made hereinafter.

It will be understood that with a set of three of the first-named planetary pinions $e$, with their extensions $g$, forming what may be termed the "primary" planets, there is a set of three of the intermediate or secondary planets $h$, each having the extension $i$, as described. Both sets are mounted on the carrier $f$ by means of the pins, as $l$, forming the axes of the respective duplex wheels or pinions. The foregoing mechanism, when the carrier $f$ is held or prevented from rotation by a brake-strap or similar device, constitutes the first or slow speed drive.

The second-speed drive is obtained as follows: Surrounding the aforesaid primary planet-wheels or pinions is an internally-toothed ring or annulus $m$, the exterior of which serves as a brake wheel or pulley, whereby rotation may be prevented. When the said ring is held against rotation and the aforesaid planet-carrier $f$ is released or set free to rotate, the toothed ring or annulus $j$, forming part of the element $k$ to be driven, will receive motion from the rotation of the planets on their respective axes $l$, as in the former case, but it will also receive an additional or increased movement due to the rotation of the planet-carrier set up by the arrest or retention of the toothed ring or annulus $m$ engaging the primary planets $e$.

For the third speed a second center or sun-wheel or pinion, as $n$, is mounted on the shaft or axle $a$ and connected by a sleeve-like extension with a brake wheel or pulley, as $o$ or its equivalent, whereby it may be held or prevented from rotation at will. The said sun-wheel or pinion $n$ gears with the extensions $i$ of the aforesaid secondary planets $h$. When the sun-wheel is held by its brake-pulley or equivalent $o$, the other brake-pulleys or like parts of the complete device being free, the toothed ring or annulus $j$ of the driven element $k$ will, as in the former case, receive motion both from the rotation of the planets on their respective axes and also from the rotation of the planet-carrier $f$; but the latter now receives its motion from the arrested or retained sun-wheel $n$ instead of from the larger toothed ring or annulus $m$, as in the second-speed drive, with the result that an increased rate of carrier rotation is obtained, which, together with the rotation of the secondary planets on their own axes, gives the required speed to the driven element $k$. The primary planets necessarily rotate on their axes, but such motion is now an idle one.

For the fourth or high speed it is merely necessary to clutch or lock together any two of the sets of intermediary gearing to give a direct connection between the driving and driven parts. Thus this result may be obtained by locking or clutching together the sun or central wheels or pinions $d$ and $n$. The said locking can be conveniently effected by any clutch, as $p$, arranged within a drum-like extension $q$ from the driving element $c$. By the operation of the clutch the brake-pulley $o$, which controls the pinion $n$, is put into connection with the driving element $c$.

The whole of the aforesaid pinions, both primary and secondary, with their extensions, (forming duplex pinions,) are preferably made of the same diameter. The two sun-wheels may also be and preferably are of equal diameters, and likewise the two internally-toothed rings or annuli $j$ and $m$.

To obtain a reverse drive, a supplemental extension or pinion, as $r$, is formed or provided with each of the primary planets $e$, but of a smaller diameter. The said pinions $r$ gear with a loose sun or central wheel, as $s$, adapted to be arrested or held against rotation by a brake-pulley or its equivalent $t$, as with the parts previously described. When the said loose sun-wheel or pinion $s$ is held against rotation, the planet-carrier $f$ is rotated in a direction opposite to that of the rotation of the main or driving sun-wheel $d$, hereinbefore referred to. The relative proportions of the said supplemental extensions $r$ of the primary planets $e$ and the sun or central wheel $s$ with which they engage are such that the reverse rotation of the planet-carrier, produced by the holding or fixing of the said sun-wheel, is greater than the like rotation which is set up when the element $k$ to be driven is stationary while the main driving element $c$ is in motion. The difference in the rate of such rotations gives the desired reverse driving movement.

Additional variations in the speed ratios may be obtained by employing an additional internally-toothed ring or annulus adapted to surround and to gear with the supplemental extensions $r$ of the primary planets $e$ and to be held or set free for rotation at will. I may also employ an addition to the said supplemental extensions and adapt same for gearing with another sun or central wheel or pinion which may be held or freed for rotation at will.

The differential or balance gear (as ordinarily employed to allow the car-wheels to rotate at varying speeds in turning a corner or otherwise) is preferably arranged in the box-like casing, as $k$, attached with the internally-toothed ring or annulus $j$ and forming the driven element, as aforesaid. The said gear may be of the bevel type, but it is preferably made up of ordinary spur-gear, as illustrated.

In the preferred arrangement a number of pinions W are adapted to gear with each other and also alternately with a central wheel, as $u$, formed with or fixed upon the aforesaid shaft or axle $a$ and an adjacent wheel $v$, formed with or fixed upon a sleeve $x$, mounted freely on the shaft or axle $a$.

The complete mechanism is made up from a compact arrangement of readily made components or parts. The respective gear-wheels or pinions are constantly in mesh or engagement, they require no sliding or like movement, and the required arrest and release of the respective brake-pulleys or like parts as aforesaid to give the required drive can be effected by the movement of but one lever or its equivalent arranged in any suitable and well-known manner.

Having thus described my invention, what I claim as new, and desire to secure by Letters Patent, is—

1. In driving-gear for motor-cars and for other services, the combination comprising central toothed wheels or pinions, internally-toothed rings or annuli surrounding the said central wheels, interengaging sets of planetary pinions in gear with the said central wheels and internally-toothed rings or annuli, a carrier, means for holding or preventing rotation of the said carrier, and pins fixed to the carrier and having the said planetary pinions freely mounted thereon, substantially as set forth.

2. In driving-gear for motor-cars and for other services, the combination comprising central toothed wheels or pinions, internally-toothed rings or annuli surrounding the said central wheels, constantly interengaging sets of planetary pinions in constant gear with the said central wheels and internally-toothed rings or annuli, a carrier, means for holding or preventing rotation of the said carrier, pins fixed to the carrier and having the said planetary pinions freely mounted thereon, and a central shaft supporting the whole of the aforesaid parts, substantially as set forth.

3. In driving-gear for motor-cars and for other services, the combination comprising a uniformly-rotating driving element and a central toothed wheel or pinion rigidly secured thereto, a driven element and an internally-toothed ring or annulus in permanent connection therewith, a central pinion arranged coaxially with the aforesaid pinion and adapted to rotate and to be held against rotation, a toothed ring or annulus arranged coaxially with the aforesaid ring or annulus and adapted to rotate and to be held against rotation, constantly interengaging sets of planetary pinions in constant gear with the said central pinions and internally-toothed rings or annuli, a carrier, means for holding or preventing rotation of the said carrier, and pins fixed to the carrier and having the said planetary pinions freely mounted thereon, substantially as set forth.

4. In driving-gear for motor-cars and for other services, the combination comprising a uniformly-rotating driving element and a central toothed wheel or pinion rigidly secured thereto, a driven element and an internally-toothed ring or annulus in permanent connection therewith, a free central pinion arranged coaxially with the aforesaid pinion, a brake-pulley adapted to hold the said free central pinion against rotation, a clutch adapted to connect the said brake-pulley with the aforesaid driving element, a toothed ring or annulus arranged coaxially with the aforesaid ring or annulus and adapted to rotate and be held against rotation, constantly interengaging sets of planetary pinions in constant gear with the said central pinions and internally-toothed rings or annuli, a carrier, means for holding or preventing rotation of the said carrier, and pins fixed to the carrier and having the said planetary pinions freely mounted thereon, substantially as set forth.

5. In driving-gear for motor-cars and for other services, the combination comprising a uniformly-rotating driving element and a central toothed wheel or pinion rigidly secured thereto, a driven element and an internally-toothed ring or annulus in permanent connection therewith, free central pinions arranged coaxially with the aforesaid pinion, brake-pulleys adapted to hold the said free central pinions against rotation, a clutch adapted to connect one of the said brake-pulleys with the aforesaid driving element, a toothed ring or annulus arranged coaxially with the aforesaid ring or annulus and adapted to rotate and to be held against rotation, constantly interengaging sets of planetary pinions in constant gear with the said central pinions and internally-toothed rings or annuli, a carrier, means for holding or preventing rotation of the said carrier, pins fixed to the carrier and having the said planetary pinions freely mounted thereon, and a central shaft supporting the whole of the aforesaid parts, substantially as set forth.

In testimony whereof I have signed my name to this specification in the presence of two subscribing witnesses.

EDGAR JOSEPH DE NORMANVILLE.

Witnesses:
    EDWARD MARKS,
    JOHN MORGAN.